G. W. McKEE.
METER CONNECTION.
APPLICATION FILED DEC. 12, 1910.
1,004,057.
Patented Sept. 26, 1911.
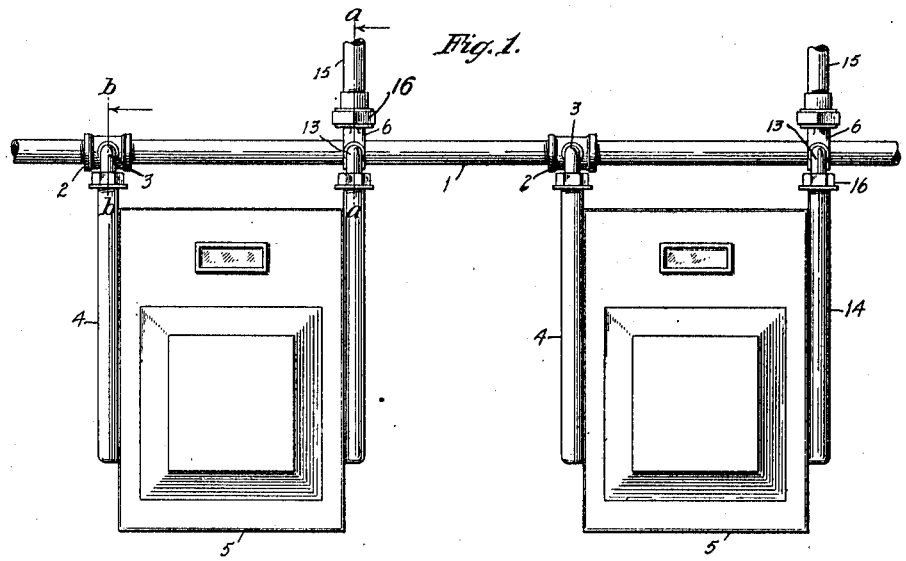
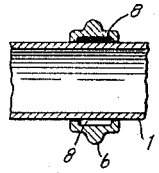
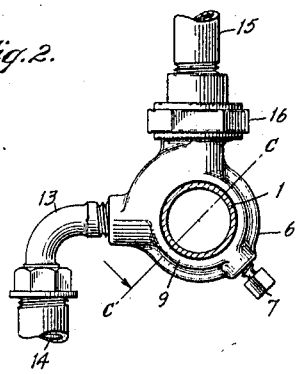
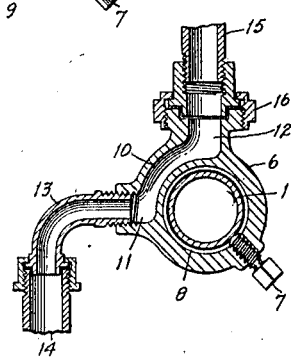
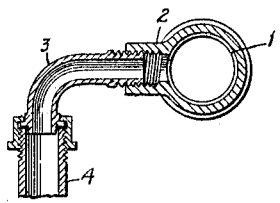

UNITED STATES PATENT OFFICE.

GARNET WOLESLEY McKEE, OF ROCKFORD, ILLINOIS, ASSIGNOR TO ECLIPSE FUEL ENGINEERING COMPANY, OF ROCKFORD, ILLINOIS, A CORPORATION OF ILLINOIS.

METER CONNECTION.

1,004,057.	Specification of Letters Patent.	Patented Sept. 26, 1911.

Application filed December 12, 1910. Serial No. 597,004.

*To all whom it may concern:*

Be it known that I, GARNET WOLESLEY McKEE, a subject of Great Britain, residing at Rockford, in the county of Winnebago and State of Illinois, have invented certain new and useful Improvements in Meter Connections, of which the following is a specification.

The object of this invention is to construct connections between the meter and gas supply pipe and consumer's supply pipe so that the supply pipe will support the weight of the meter. The consumer's supply pipe connection is adjustable to suit meters of varying widths.

In the accompanying drawings, Figure 1 shows in elevation a plurality of gas meters connected by my improvements. Fig. 2 is an end elevation of one of the connections and the supply pipe in section. Fig. 3 is a section on dotted line *a a* Fig. 1. Fig. 4 is a section on dotted line *b b* Fig. 1. Fig. 5 is a section on dotted line *c c* Fig. 2.

The gas supply pipe 1 has T's 2 located at intervals according to the number of meters which are supported by it. To each T 2 is connected a pipe 3, and its other end is connected to the inlet pipe 4 of the meter 5.

Around the gas supply pipe is located a ring 6 which is held in connection therewith by the set screw 7. This ring has a recessed inner face 8 which leaves the two edges 9 bearing against the supply pipe 1 so that it will be firmly seated in position. This ring is formed with a chamber 10 having an inlet opening 11 and an outlet opening 12. A pipe 13 is located in the inlet opening 11 and its other end is connected with the outlet pipe 14 of the meter. A consumer's supply pipe 15 is connected to the outlet opening 12 of the chamber 10 and a union 16 is connected with this pipe.

The flow of gas is from the supply pipe 1 into the meter by way of pipe 3, from the meter by way of the pipe 13, into the chamber 10 of the ring and to the consumer's supply pipe 15.

By thus supporting the ring by the main gas supply pipe other supports are not necessary for the meter, and the consumer's supply pipes serve to support the main supply pipe, also the meters.

By clamping the ring to the main gas supply pipe, the meters are held firmly in position, and free from jar thereby holding the operative parts free from injury.

I claim as my invention.

1. A meter connection comprising a main gas supply pipe, a meter, a gas connection between the supply pipe and meter, a consumer's supply pipe, a support in engagement with the supply pipe and provided with a passage way, the consumer's supply pipe connected with the support and communicating with the passage way, and a pipe connecting the support and meter and communicating with the passage way.

2. A meter connection comprising a main gas supply pipe, a meter, a gas connection between the supply pipe and meter, a consumer's supply pipe, a support surrounding the supply pipe and provided with a passage way, a set screw for clamping the support to the pipe, the consumer's supply pipe connected with the support and communicating with the passage way, and a pipe connecting the support and meter and communicating with the passage way.

In testimony whereof I have hereunto set my hand in presence of two subscribing witnesses.

GARNET WOLESLEY McKEE.

Witnesses:
 R. O. BEHEL,
 E. D. E. N. BEHEL.

Copies of this patent may be obtained for five cents each, by addressing the "Commissioner of Patents, Washington, D. C."